United States Patent
Regnier

(10) Patent No.: US 9,175,172 B2
(45) Date of Patent: Nov. 3, 2015

(54) POLYURETHANE-BASED PRIMER FOR ENHANCING ADHESION OF LIQUID TONER

(71) Applicant: Michelman, Inc., Cincinnati, OH (US)

(72) Inventor: Baptiste Regnier, Thionville (FR)

(73) Assignee: MICHELMAN, INC., Cincinnati, OH (US)

( * ) Notice: Subject to any disclaimer, the term of this patent is extended or adjusted under 35 U.S.C. 154(b) by 183 days.

(21) Appl. No.: 13/775,458

(22) Filed: Feb. 25, 2013

(65) Prior Publication Data

US 2013/0224395 A1   Aug. 29, 2013

Related U.S. Application Data

(60) Provisional application No. 61/602,850, filed on Feb. 24, 2012.

(51) Int. Cl.
| | | |
|---|---|---|
| C09D 175/04 | (2006.01) | |
| C09D 5/00 | (2006.01) | |
| C08G 18/08 | (2006.01) | |
| B41M 5/52 | (2006.01) | |
| G03G 7/00 | (2006.01) | |
| B41M 5/50 | (2006.01) | |

(52) U.S. Cl.
CPC .......... *C09D 5/002* (2013.01); *B41M 5/50* (2013.01); *B41M 5/5227* (2013.01); *B41M 5/5272* (2013.01); *C08G 18/0866* (2013.01); *C09D 175/04* (2013.01); *G03G 7/002* (2013.01); *G03G 7/006* (2013.01); *G03G 7/0046* (2013.01)

(58) Field of Classification Search
CPC .............................. C09D 5/002; C09D 175/04
USPC ........................................................ 524/458
See application file for complete search history.

(56) References Cited

U.S. PATENT DOCUMENTS

| | | | |
|---|---|---|---|
| 4,578,285 A | | 3/1986 | Viola |
| 5,102,737 A | | 4/1992 | Josephy et al. |
| 5,427,847 A | | 6/1995 | Zawada |
| 5,821,298 A | | 10/1998 | Reynolds et al. |
| 6,096,427 A | | 8/2000 | Chen et al. |
| 6,616,992 B2 | | 9/2003 | Ito et al. |
| 6,881,458 B2 | | 4/2005 | Ludwig et al. |
| 6,926,957 B2 | | 8/2005 | Engel et al. |
| 7,470,736 B2 | | 12/2008 | Cooper |
| 2002/0160203 A1* | | 10/2002 | Robertson ................. 428/423.1 |
| 2004/0197572 A1 | | 10/2004 | Bell |
| 2005/0245651 A1* | | 11/2005 | Cooper ........................ 524/270 |
| 2008/0081160 A1 | | 4/2008 | Anderle et al. |
| 2008/0113126 A1 | | 5/2008 | Anderson et al. |
| 2010/0129746 A1 | | 5/2010 | Jung et al. |
| 2010/0215874 A1 | | 8/2010 | Wang et al. |

FOREIGN PATENT DOCUMENTS

| | | |
|---|---|---|
| JP | 2007160746 A | 6/2007 |
| WO | 03/066761 A2 | 8/2003 |
| WO | 2004/082952 A2 | 9/2004 |
| WO | 2010/091346 A1 | 8/2010 |

OTHER PUBLICATIONS

International Preliminary Report on Patentability dated Aug. 26, 2014 pertaining to International application No. PCT/US2013/027586.
International Search Report and Written Opinion dated Apr. 24, 2013 pertaining to International Application No. PCT/US2013/027586.

* cited by examiner

*Primary Examiner* — Doris Lee
(74) *Attorney, Agent, or Firm* — Dinsmore & Shohl LLP

(57) ABSTRACT

A water-based primer coating for use on paper and polymeric substrates is provided for enhancing the adhesion of liquid toner to the substrates, which are designed to be printed using an electrophotographic printing device. The primer coating includes an aliphatic polyurethane dispersion and an anionic wax emulsion, and is substantially free of copolymers of ethylene and acrylic acid.

18 Claims, No Drawings

POLYURETHANE-BASED PRIMER FOR ENHANCING ADHESION OF LIQUID TONER

CROSS REFERENCE TO RELATED APPLICATIONS

This application claims the benefit of U.S. Patent Application Ser. No. 61/602,850, entitled POLYURETHANE-BASED PRIMER FOR ENHANCING ADHESION OF LIQUID TONER filed Feb. 24, 2012. The entire contents of said application is hereby incorporated by reference.

BACKGROUND OF THE INVENTION

Embodiments of the invention relate to a water-based primer coating for use on paper and polymeric substrates, and more particularly, to a polyurethane-based primer coating for enhancing the adhesion of liquid toner to substrates which are designed to be printed using an electrophotographic printing device.

In recent years, the use of on-demand digital printing machines utilizing liquid electrophotographic systems has become widespread. In such systems, liquid toner images are formed on a photosensitive drum and then electrically transferred onto an intermediate transfer blanket or belt for printing on a paper or polymeric film sheet or web. Printers using such toners or inks are commercially available from Hewlett-Packard Company under the trade name HP Indigo.

However, it is well known in the art that liquid toners to do not transfer well and/or adhere well to films or paper substrates unless those films or paper substrates have been treated with a coating or primer to enhance their adhesion to a substrate.

A number of primers have been developed for use on substrates such as polymeric films which render the surface of the films more receptive to liquid toners. Typical primers currently in use have been developed based on ethylene-acrylic acid copolymers. As described in commonly-assigned U.S. Pat. No. 7,470,736, one such primer coating includes a copolymer of ethylene and acrylic or methacrylic acid and a compatible adhesion enhancer which is used to enhance the adhesion of liquid toner to a variety of polymeric substrates.

However, the development of newer, high speed digital presses has presented new challenges to the use of such primers for liquid toner transfer and adhesion to the substrate. For example, the more recently developed HP Indigo 6000 series of digital presses offer higher speed printing at about twice the speed of conventional printing presses. These higher speeds require shorter toner to substrate transfer times, which in turn require lower activation temperatures for the primer to effectively enhance toner transfer and adhesion to the printed substrate. As a result, substrates coated with existing primers may provide poor toner transfer and adhesion when run through the newest generation of digital printing presses.

Accordingly, there is a need in the art for a primer for use with high speed digital printing presses which provides good liquid toner transfer and adhesion to a variety of substrates.

SUMMARY OF THE INVENTION

Embodiments of the invention meet those needs by providing a primer for use on a variety of substrates including polymers and paper. The primer coating is water-based and provides enhanced liquid toner or ink transfer and adhesion to substrates printed on electrophotographic devices, especially those substrates which are printed using the latest generation of high speed electrophotographic printing systems. The primer may be applied off-line, or can be applied and dried in-line with the printing systems.

According to one aspect of the invention, a primer coating for enhancing adhesion of liquid toner to a substrate is provided which comprises an aliphatic polyurethane dispersion and an anionic wax emulsion, where the coating is substantially free of copolymers of ethylene and acrylic acid. By "substantially free," it is meant that the coating is completely free of copolymers of ethylene and acrylic acid or that such copolymers are present only in trace amounts of, for example, less than about 1.0 wt %, which amounts are insufficient to enhance toner receptivity performance.

The anionic wax emulsion comprises a wax which is selected from the group consisting of polyethylene wax, carnauba wax, high density polyethylene wax, and combinations thereof.

The primer coating preferably further includes a wetting agent. The wetting agent is preferably selected from the group consisting of alcohols and surfactants. A preferred wetting agent is propylene glycol.

The coating may contain a number of additional additives including surfactants such as triethanolamine, sodium lauryl sulfate, and nonionic secondary alcohol ethoxylate, which function to prevent premature drying of the coating after application. The coating may also contain antifoaming agents and/or biocides.

The primer coating preferably comprises from about 55 to 75% by weight of the aliphatic polyurethane dispersion (containing 30 to 35% by weight total solids) and from about 5 to 15% by weight of the anionic wax emulsion (25 to 45% by weight total solids), with the balance comprising water and optional additives.

The primer coating may be applied to a number of substrates including polymers such as polypropylene, polyethylene, biaxially oriented polypropylene, polyethylene terephthalate, polyvinyl chloride; paper substrates, or metallized paper substrates. The primer coating is preferably applied to a substrate by application to at least one major surface of the substrate followed by drying the coating. The coating may be applied in-line on a press which is fitted with an in-line priming unit. Alternatively, the coating may be applied off-line using flexographic or gravure coating techniques.

Prior to applying the primer coating, it is preferable to use a flame treatment or corona discharge treatment on the substrate. This treatment may be applied either in-line or off-line.

Upon drying, a coating is formed having a thickness sufficient to enhance toner adhesion, which is typically from about 0.1 to about 2 microns, and more preferably, from about 0.20 to about 0.30 microns. The primed substrate may then be overprinted by applying, e.g., liquid toner, from a digital printing apparatus to the primed surface of the substrate.

Accordingly, it is a feature of embodiments of the invention to provide a primer coating for application to substrates which provides enhanced adhesion to the coated substrates when printed with liquid toners using electrophotographic printing devices. These, and other features and advantages of the invention will become apparent from the following detailed description and appended claims.

DETAILED DESCRIPTION OF THE PREFERRED EMBODIMENTS

Embodiments of the primer coating provide good bond strength when used on substrates which are printed with high speed digital presses such as the Indigo WS 6000 series of digital presses. The primer coating also works well as a print receptive coating on substrates printed on other well known Indigo presses such as the WS 4000, WS 4500, and the like. By "high speed," we mean a press having a linear speed of up about 30 meters/min. for a four-color mode, and about 60 meters/min. for a two-color mode. The primer coating is particularly useful when applied to polymeric substrates which are printed using HP Indigo WS6600 or WS6000 Digital Presses. These presses are designed to print onto labels for packaging, including wine labels, flexible packaging, sleeves, and folding cartons. Such digital presses include an optional in-line priming unit which allows the press to apply primer to uncoated substrates in-line and dry the primer just prior to printing. Thus, the presses are capable of priming and printing substrates in a single pass.

Alternatively, the primer coating may be applied to a substrate off-line by conventional flexographic or gravure coating techniques.

The coating provides good liquid toner transfer and adhesion, and results in a non-blocking surface once dried. By non-blocking, we mean that the coated substrate can be wound after coating on one surface and can be unwound without causing feeding problems in the printing press. The coating also provides non-blocking properties after printing when the printed substrate may be wound/unwound and applied to surfaces or formed into containers. In addition, the coating does not require the use of any additional primers or precoatings to achieve proper adhesion of the liquid toner to the substrate. The coating is also environmentally friendly as it is aqueous-based.

Unless otherwise indicated, the disclosure of any ranges in the specification and claims are to be understood as including the range itself and also anything subsumed therein, as well as endpoints.

The primer coating includes an aliphatic polyurethane dispersion which comprises from about 55 to 75% of the coating, and contains about 30 to 35% total solids. Suitable polyurethane dispersions are commercially available from NeoResins under the designation NeoRez® R-600, or NeoRez® FP-967-D. Other suitable aliphatic polyurethane dispersions include NeoRez® R-610 (available from NeoResins), NeoRez® R-605 XP (available from DSM) and Kamthane S-1801 (available from Kamsons).

Still other suitable aliphatic polyurethane dispersions are commercially available from BASF under the designations Epotal® FLX 3621 (an amorphous polyurethane dispersion), Epotal® P 350 (an elastomeric polyether polyurethane dispersion), Emuldur® 381 A (an elastomeric polyester polyurethane dispersion), Luphen® D 207 (an elastomeric polyester-polyurethane dispersion), Luphen® D 259 (an elastomeric polyether-polyurethane dispersion), and Luphen® 585 (an elastomeric polyester-polyurethane dispersion); from Lubrizol under the designations Sancure® 2170 and 2175; and from Baxenden Chemicals under the designations Witcobond® 781 and 373-04.

The anionic wax emulsion may comprise a polyethylene wax emulsion, a carnauba wax emulsion, a high density polyethylene wax emulsion, or a combination thereof. In a preferred embodiment, we have found that by using a combination of wax emulsions, the coating has enhanced non-blocking properties over the use of a single wax without any negative impact on toner adhesion. A suitable polyethylene wax emulsion is commercially available from Michelman, Inc. under the designation ME61335P (solids content of 34.5 to 35.5%). Suitable carnauba wax emulsions are also available from Michelman, Inc. under the designations Michem® Lube 193 (solids content of 24.5 to 25.5%) or Michem® Emulsion 1270 (24.5 to 25.5%). A suitable high density polyethylene wax emulsion is available from Michelman, Inc. under the designation Michem® Emulsion D800 (solids content of 40.0 to 44.0%). A preferred primer coating contains about 2 to 6% by weight of a polyethylene wax emulsion, about 4 to 8% by weight of a carnauba wax emulsion, and about 0.1 to 1% by weight of a high density polyethylene wax emulsion such that the coating contains about 5 to 15% total weight of the anionic wax emulsion, which has a total solids content of about 25 to 45%.

The coating preferably further contains from 0 to about 5% by weight of a wetting agent for reducing the surface tension of the coating to wet out the substrate and to promote flow or leveling of the coating prior to drying. Suitable wetting agents include surfactants and alcohols. A preferred wetting agent is propylene glycol.

The coating may optionally contain a number of additional additives in individual amounts of about 0.50 to 5% by weight. Such additives include surfactants such as triethanolamine, sodium lauryl sulfate, nonionic secondary alcohol ethoxylate, or antifoaming agents and/or biocides.

Additional water (preferably soft water) may also be added to the primer coating to lower the viscosity of the coating and aid in flow of the coating. The coating may contain from 0 to about 30 wt % soft water. The coating preferably has a viscosity of less than about 50 cPs.

The components of the primer coating are preferably mixed together by combining all components into an open reactor at ambient temperature.

While the primer coating is substantially free of copolymers of ethylene and acrylic acid, it should be appreciated that the additives and waxes in the coating may contain minor amounts of ethylene acrylic acid copolymer. The total ethylene acrylic acid copolymer content is preferably less than 1 wt %, more preferably less than 0.5 wt % and most preferably, less than 0.1 wt %. Such amounts are insufficient to have any effect on toner adhesion to the underlying substrate.

The resulting primer coating may be applied to a substrate in any manner including gravure coating, roll coating, flexographic printing, wire rod coating, spray coating, screen printing, and the like. Upon drying, the coating forms a smooth, evenly distributed layer of about 0.1 to 2 microns in thickness, and preferably, from about 0.3 to 0.5 microns in thickness. After the coating is applied, it may be dried by hot air, radiant heat, or any other suitable means which provides a clear, adherent coated film.

The primer coating provides enhanced adhesion of HP Indigo Electroinks® and other liquid toners when applied to substrates such as paper and metallized paper, as well as polymer substrates such as polyethylene, polypropylene, biaxially oriented polypropylene, polyethylene terephthalate, and polyvinyl chloride.

In order that the invention may be more readily understood, reference is made to the following example, which is intended to illustrate the invention, but is not to be taken as limiting the scope thereof.

EXAMPLE 1

The following primer coating was prepared by combining all of the following components into an open reactor at room temperature:

| Component | Parts by Weight | Solids Content |
|---|---|---|
| Aliphatic polyurethane dispersion[1] | 65.70 | 30 to 35% |
| Propylene glycol | 4.00 | 100% |
| Anionic polyethylene wax emulsion[2] | 4.28 | 34.5 to 35.5% |

-continued

| Component | Parts by Weight | Solids Content |
|---|---|---|
| Anionic carnauba wax emulsion[3] | 6.00 | 24.5 to 25.5% |
| Anionic high density polyethylene wax emulsion[4] | 0.30 | 40.0 to 44.0% |
| Nonionic secondary alcohol ethoxylate[5] | 1.00 | 100% |
| Water | 18.52 | |
| Biocide | 0.20 | 10% |
| | 100.00 | |

[1]Neorez 600 from NeoResins
[2]Michem ® Emulsion 61335 from Michelman, Inc.
[3]Michem ® Lube 193 from Michelman, Inc.
[4]Michem ® Emulsion D800 from Michelman, Inc.
[5]Tergitol 15S15

EXAMPLE 2

The primer coating of Example 1 was coated onto various substrates and dried. The coated substrates were then printed on a Hewlett-Packard WS6600 printer and tested for adhesion of toner to the substrate. The adhesion test was performed using ASTM method F2252-03 by applying adhesive tape to the printed substrates. 810 3M Scotch magic tape was used on synthetic stock substrates (polyester (PE) label, polypropylene (PP) label, biaxially oriented polypropylene (BOPP) label, polyethylene terephthalate (PET) film), and 230 3M Scotch drafting tape was used for paper stock substrates (coated paper, wine labels, paper labels). The tape was pressed on the substrate by passing a 2 kg. roller over the substrate twice in each direction and then peeling the tape away at a constant rate after 20 minutes. The results are shown below in Table 1 below. By "transfer," it is meant the percentage of ink transferred from the printing blanket to the substrate. Bad transfer is indicated by missing dots (or white dots) onto the image. The transfer percentage was determined using a scanner which showed the white surface proportion on total ink surface (black). By "fixing," it is meant the percent of adhesion of the toner to the substrate. Fixing was also determined using a scanner.

TABLE 1

| Substrate | Second Transfer (%) | Fixing (%) |
|---|---|---|
| PP transparent label | 100 | 97-100 |
| PP white label | 100 | 100 |
| PE transparent label | 100 | 100 |
| PE white label | 100 | 100 |
| Paper label | 100 | 99 |
| Metallized Paper label | 100 | 95-100 |
| Wine label | 100 | 90 |
| PE transparent film | 100 | 97-100 |
| PET transparent film | 100 | 95-100 |
| PVC shrink sleeve film | 100 | 95-100 |
| BOPP transparent film | 100 | 100 |
| BOPP white film | 100 | 99-100 |
| Coated Paper | 100 | 100 |
| Uncoated Paper | 100 | 99 |

As can be seen, the formulation achieved 100% ink transfer to all substrates, and exhibited close to 100% fixing on all substrates.

Having described the invention in detail and by reference to preferred embodiments thereof, it will be apparent that modifications and variations are possible without departing from the scope of the invention.

What is claimed is:

1. A primer coating for enhancing adhesion of liquid toner to a substrate, said coating comprising:
   a) an aliphatic polyurethane dispersion;
   b) an anionic wax emulsion comprising polyethylene wax and carnauba wax;
wherein said wax emulsion further comprises high density polyethylene wax;
wherein said coating is substantially free of copolymers of ethylene and acrylic acid.

2. The primer coating of claim 1 further including a wetting agent selected from the group consisting of alcohols and surfactants.

3. The primer coating of claim 1 wherein said substrate comprises a cellulosic or polymeric substrate.

4. The primer coating of claim 1 wherein the anionic wax emulsion comprises about 2 to about 6% by weight of polyethylene wax, about 4 to about 8% by weight of carnauba wax, and about 0.1 to about 1% by weight of high density polyethylene wax emulsion.

5. The primer coating of claim 1 wherein said substrate comprises a cellulosic or polymeric substrate.

6. The primer coating of claim 5 wherein said anionic wax emulsion comprises about 24 to 45% total solids.

7. The primer coating of claim 1 comprising from about 55 to 75% by weight of said aliphatic polyurethane dispersion.

8. The primer coating of claim 7 wherein said aliphatic polyurethane dispersion comprises about 30 to 35% total solids.

9. The primer coating of claim 7 wherein the coating comprises from about 5 to about 15% by weight of said anionic wax emulsion.

10. A primer coating for enhancing adhesion of liquid toner to a substrate, said coating comprising:
    a) an aliphatic polyurethane dispersion;
    b) an anionic wax emulsion comprising carnauba wax;
wherein said wax emulsion further comprises high density polyethylene wax;
wherein said coating is substantially free of copolymers of ethylene and acrylic acid.

11. The primer coating of claim 10 comprising from about 55 to 75% by weight of said aliphatic polyurethane dispersion.

12. The primer coating of claim 10 comprising from about 5 to 15% by weight of said anionic wax emulsion.

13. The primer coating of claim 10 further including a wetting agent selected from the group consisting of alcohols and surfactants.

14. The primer coating of claim 10 wherein said anionic wax emulsion comprises about 24 to 45% total solids, and said aliphatic polyurethane dispersion containing comprises about 30 to 35% total solids.

15. A method of applying a primer coating to a substrate for enhancing adhesion of liquid toner thereto comprising:
    providing a substrate having first and second major surfaces;
    applying a primer coating to at least one of said major surfaces of said substrate, said primer coating comprising an aliphatic polyurethane dispersion and an anionic wax emulsion comprising polyethylene wax and carnauba wax; wherein said wax emulsion further comprises high density polyethylene wax; wherein said coating is substantially free of copolymers of ethylene and acrylic acid.

16. The method of claim 15 including treating said at least one major surface of said substrate by a flame treatment or corona discharge treatment prior to applying said coating.

17. The method of claim 15 including drying said coating after applying said coating to said substrate.

18. The method of claim 17 wherein said dried primer coating has a thickness of about 0.1 to 2 microns.

* * * * *